(12) United States Patent
Nakao et al.

(10) Patent No.: US 12,365,150 B2
(45) Date of Patent: Jul. 22, 2025

(54) FIBER PLACEMENT DEVICE

(71) Applicant: Toray Industries, Inc., Tokyo (JP)

(72) Inventors: Ryota Nakao, Otsu (JP); Tamotsu Suzuki, Ostu (JP); Yasuhiro Sato, Ostu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 18/663,426

(22) Filed: May 14, 2024

(65) Prior Publication Data

US 2024/0300189 A1 Sep. 12, 2024

Related U.S. Application Data

(63) Continuation of application No. 17/913,076, filed as application No. PCT/JP2021/012353 on Mar. 24, 2021, now abandoned.

(30) Foreign Application Priority Data

Mar. 30, 2020 (JP) ................................. 2020-059393

(51) Int. Cl.
*B29C 70/38* (2006.01)
*B29C 70/16* (2006.01)
*B29K 105/08* (2006.01)

(52) U.S. Cl.
CPC ............ *B29C 70/384* (2013.01); *B29C 70/16* (2013.01); *B29K 2105/08* (2013.01)

(58) Field of Classification Search
CPC ....... B29C 70/384; B29C 70/16; B29C 70/38; B29K 2105/08
See application file for complete search history.

(56) References Cited

U.S. PATENT DOCUMENTS

| 5,936,861 A | 8/1999 | Jang et al. |
| 2017/0291377 A1 | 10/2017 | Tsuji et al. |

(Continued)

FOREIGN PATENT DOCUMENTS

| JP | 2004-66593 A | 3/2004 |
| JP | 2011-057767 A | 3/2011 |

(Continued)

OTHER PUBLICATIONS

International Search Report dated Jun. 22, 2021, in counterpart International Application No. PCT/JP2021/012353 along with and English translation.

*Primary Examiner* — George R Koch
*Assistant Examiner* — Christopher C Caillouet
(74) *Attorney, Agent, or Firm* — DLA Piper LLP (US)

(57) ABSTRACT

A fiber placement device that includes a placement surface on which a reinforcing fiber tow is placed and stacked; a tow arranging mechanism which presses and places the reinforcing fiber tow against and on the placement surface; and a heating mechanism which is configured to heat the placement surface. In one placement cycle, the tow arranging mechanism presses a group of the reinforcing fiber tows against the placement surface heated in advance by the heating mechanism, moves by a predetermined length in a first axial direction to glue and fix the group of the reinforcing fiber tows onto the placement surface, and move the placement surface in a second axial direction which substantially intersects the first axial direction.

7 Claims, 10 Drawing Sheets

(56) References Cited

U.S. PATENT DOCUMENTS

| | | |
|---|---|---|
| 2017/0326809 A1 | 11/2017 | Nishimura |
| 2018/0093397 A1* | 4/2018 | Tsuji .......................... B32B 5/12 |
| 2018/0093433 A1 | 4/2018 | Treiber et al. |
| 2019/0009471 A1 | 1/2019 | Wilenski et al. |
| 2020/0376780 A1 | 12/2020 | Kim et al. |

FOREIGN PATENT DOCUMENTS

| | | |
|---|---|---|
| JP | 2014-100911 A | 6/2014 |
| WO | 2016/047141 A1 | 3/2016 |
| WO | 2016/146902 | 9/2016 |

* cited by examiner

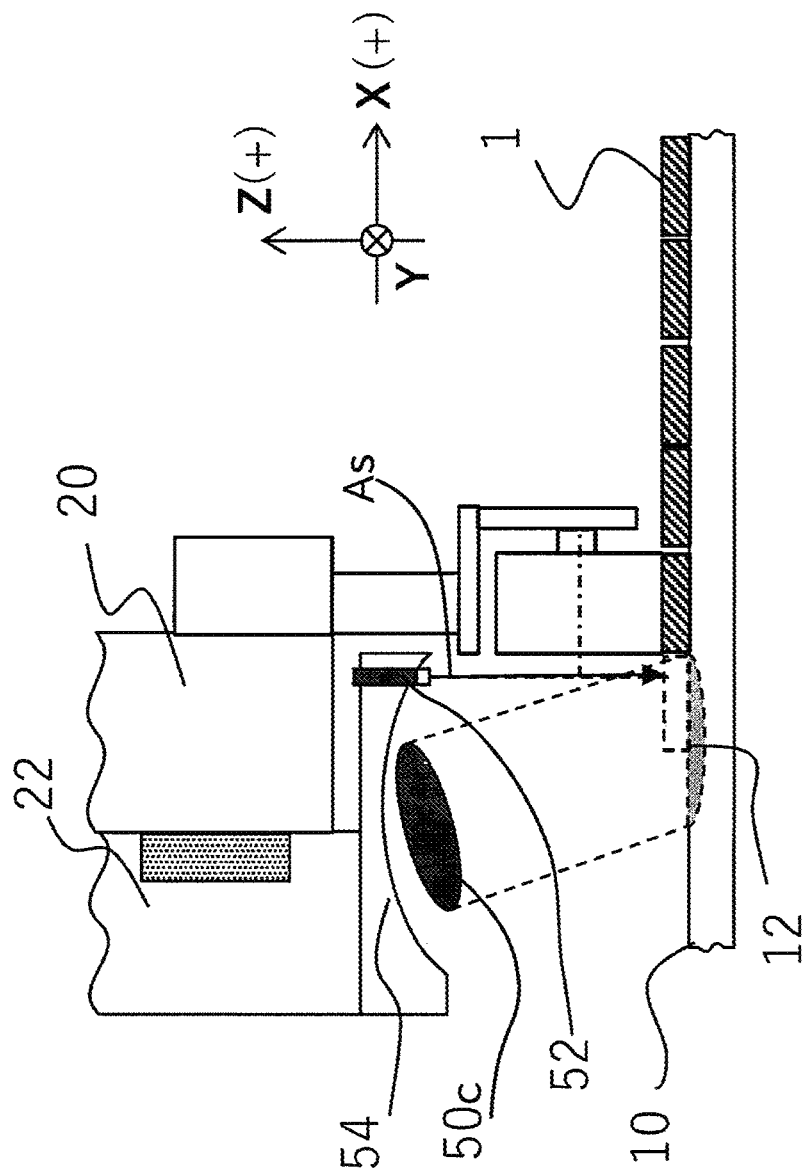

FIBER PLACEMENT DEVICE

TECHNICAL FIELD

This disclosure relates to a fiber placement device used to manufacture a reinforcing fiber plastic product.

BACKGROUND

A following technique is known as a method of manufacturing a preform used to manufacture a reinforcing fiber plastic product and having a three-dimensional shape, and formed by reinforcing fibers such as glass fibers or carbon fibers. According to that technique, a cut pattern having a two-dimensional shape matching a shape of a preform of interest is cut out first from a belt-like woven fabric formed by reinforcing fibers. The cut pattern is pressed to form the preform having a three-dimensional shape. However, according to that method, the woven fabric left after the cut pattern is cut out from the belt-like woven fabric is discarded. Hence, the method has a problem that a yield rate of reinforcing fibers is poor, and manufacturing cost is high.

As one method of solving the problem, a fiber placement method is known. According to the fiber placement method, a plurality of reinforcing fiber tows are placed only at a necessary place on a table to form a two-dimensional shape matching a shape of a preform of interest, and are bonded to each other. The reinforcing fiber tows placed in the two-dimensional shape in this way are pressed to manufacture the preform having the three-dimensional shape.

WO 2016/047141 discloses a fiber placement device which can place a reinforcing fiber tow on a table at a high speed by using that method. The device includes a tow pressing mechanism which can press the reinforcing fiber tow against the table, a tow supply mechanism which can supply the reinforcing fiber tow to the table, and a cutting blade positioned independently from the tow supply mechanism, and is able to cut the reinforcing fiber tow when the above tow pressing mechanism presses the reinforcing fiber tow against a blade tip. By using that device, it is possible to place the reinforcing fiber tow in a desired two-dimensional shape on the table. Consequently, the yield rate of the reinforcing fibers is improved. Furthermore, the device can cut the reinforcing fiber tow without decelerating traveling of the tow supply mechanism. Consequently, the reinforcing fiber tow is placed at a higher speed.

For example, JP 2011-57767 A discloses a following device as a technique which further stacks a reinforcing fiber tow on the placed reinforcing fiber tow. That device presses a reinforcing fiber fabric to which a binder has adhered against a reinforcing fiber fabric layer stacked on a preform molding jig, or against the preform molding jig, by a heating/pressurizing roller. While the heating/pressurizing roller presses the reinforcing fiber fabric, the binder melts and glues the reinforcing fiber fabric.

For example, WO 2016/146902 discloses a following device as a technique which secures a heating time of a binder included in a reinforcing fiber fabric which is being placed. That device includes a pressurizing roller which presses the reinforcing fiber tow against a stacking jig. The device preheats part of an area of the stacking jig in a traveling direction of the pressurizing roller in addition to the reinforcing fiber tow on an upstream side of the pressurizing roller. By using the device, it is possible to heat in advance the area in which the reinforcing fiber tow is placed. As a result, by arranging the reinforcing fiber tow in the preheated area, it is possible to soften or melt the binder by heating in a relatively short time, and reduce a tact time required to manufacture preforms.

The device disclosed in WO 2016/047141 uses a suction table as a means for fixing the reinforcing fiber tow onto the table. Hence, the reinforcing fiber tow in direct contact with the suction table is fixed onto the suction table. However, when a reinforcing fiber tow is further overlaid and placed in the area in which the reinforcing fiber tow has already been placed on the suction table, the reinforcing fiber tow cannot be fixed onto the suction table. Hence, following processing is necessary to obtain a preform in which a plurality of reinforcing fiber tows are stacked by using the above device. That is, after a group of reinforcing fiber tows corresponding to one layer is placed in a two-dimensional shape matching a preform to be generated, the group of reinforcing fiber tows is transported to another stacking table. Furthermore, the group of reinforcing fiber tows is further stacked on groups of reinforcing fiber tows corresponding to a plurality of layers which have already been stacked on the stacking table. This processing is performed, and therefore the technique according to WO 2016/047141 has a problem that a tact time taken to manufacture a preform is long and manufacturing cost increases.

Furthermore, to glue the reinforcing fiber fabric by using the device disclosed in JP 2011-57767 A, it is necessary to heat powder-binders in the reinforcing fiber fabric to a melting point while the heating/pressurizing roller and the reinforcing fiber fabrics guided to the heating/pressurizing roller are in contact. Therefore, it is necessary to secure a sufficiently long contact time of the heating/pressurizing roller and the reinforcing fiber fabrics. Therefore, a speed to place the reinforcing fiber fabrics is restricted, and a tact time taken to manufacture preforms becomes long.

A heating mechanism which preheats the stacking jig is mounted on a placement head including the pressurizing roller in the device disclosed in WO 2016/146902. Furthermore, the area preheated by the heating mechanism is limited to an area in the traveling direction of the pressurizing roller. Therefore, it has been similarly impossible to set a higher speed for arranging reinforcing fiber tow to sufficiently heat the area in the traveling direction of the pressurizing roller. As a result, a reduction effect of the tact time taken to manufacture preforms has been limited.

It could therefore be helpful to provide a reinforcing fiber tow at a higher speed and reduce the time required to manufacture preforms by reducing a heating standby time for melting or softening a binder.

SUMMARY

We thus provide:

(1) A fiber placement device. The fiber placement device includes: a placement base which includes a placement surface on which a reinforcing fiber tow is placed and stacked; a tow arranging mechanism configured to feed the reinforcing fiber tow while pressing the reinforcing fiber tow against the placement surface, and place the reinforcing fiber tow on the placement surface along a first direction; a heating mechanism configured to heat part of an area of the placement surface; and a control unit which controls the fiber placement device. The placement base and the tow arranging mechanism are configured to relatively move in a second direction which intersects the first direction. The placement base and the heating mechanism are configured to relatively move in the second direction. The control unit is configured to repeatedly perform a placement cycle.

The placement cycle includes first processing of causing the tow arranging mechanism to place the reinforcing fiber tow of a predetermined length on the placement surface along the first direction, and second processing of relatively moving the placement base in the second direction with respect to the tow arranging mechanism. The control unit causes the heating mechanism to heat at least part of an area in which the reinforcing fiber tow is placed in an nth (n is a natural number equal to or more than two) placement cycle until an (n−1)th placement cycle is finished.

(2) The fiber placement device can achieve an aspect where the control unit causes the heating mechanism to heat whole area in which the reinforcing fiber tow is placed in the nth placement cycle until the (n−1)th placement cycle is finished.

(3) The fiber placement device can achieve an aspect where the control unit causes the heating mechanism to heat at least the part of the area in which the reinforcing fiber tow is placed in the nth placement cycle during a period in which the (n−1)th placement cycle is executed.

(4) The fiber placement device can achieve an aspect where the heating mechanism includes a plurality of heating devices placed along the first direction and configured to be each independently controlled, and the control unit sets a higher temperature to a heating device which heats an area in which the reinforcing fiber tow is lastly placed in the nth placement cycle among the plurality of heating devices than a temperature of a heating device which heats an area in which the reinforcing fiber tow is firstly placed in the nth placement cycle among the plurality of heating devices.

The fiber placement device employs configurations (1) to (4) to handle the above task.

(1) The fiber placement device includes at least: a placement surface on which a reinforcing fiber tow is placed and stacked; a tow arranging mechanism which presses and places the reinforcing fiber tow against and on the placement surface; and a heating mechanism which partially heats the placement surface, and can move the tow arranging mechanism to a predetermined position, cause the tow arranging mechanism to move by a predetermined length in a first axial direction after the tow arranging mechanism presses the reinforcing fiber tow against the placement surface heated in advance by the heating mechanism, and repeatedly perform a placement cycle of moving the placement surface in a second axial direction which intersects the first axial direction after gluing and fixing the reinforcing fiber tow onto the placement surface, the heating mechanism is configured to be relatively movable along the second axial direction with respect to the placement surface, and the heating mechanism is moved to an upper side of an area in which the reinforcing fiber tow is placed in an nth (n is the natural number equal to or more than two) placement cycle until an (n−1)th placement cycle is finished to heat the area in advance.

(2) According to the fiber placement device described in (1), the heating mechanism moved to the area in which the reinforcing fiber tow is placed in the nth placement cycle heats in advance an entire area in which the reinforcing fiber tow is placed in the nth placement cycle.

(3) According to the fiber placement device described in (1) or (2), the heating mechanism moved to the area in which the reinforcing fiber tow is placed in the nth placement cycle heats in advance the area in which the reinforcing fiber tow is placed in the nth placement cycle while the (n−1)th placement cycle is performed.

(4) According to the fiber placement device described in any one of (1) to (3), the heating mechanism includes a group of heating devices which are divided into a plurality of areas along the first axial direction, and the group of the heating devices is configured to independently adjust a heating state.

We also provide a fiber placement device manufacturing method, a fiber placement device control method, a computer program which realizes this fiber placement device control method and a non-transitory recording medium having this computer program recorded thereon.

By using the fiber placement device, it is possible to separately perform heating processing for melting or softening of binders included in reinforcing fiber tows, and a placement operation of the tow arranging mechanism. Consequently, it is possible to place and stack the reinforcing fibers tow on a placement surface at a high speed irrespectively of a heating standby time of the binders.

BRIEF DESCRIPTION OF THE DRAWINGS

FIG. 7 is an explanatory view illustrating a state where the heating mechanism 50c included in a fiber placement device 100c lies along the Y axis direction.

REFERENCE SIGNS LIST

Figure 1:
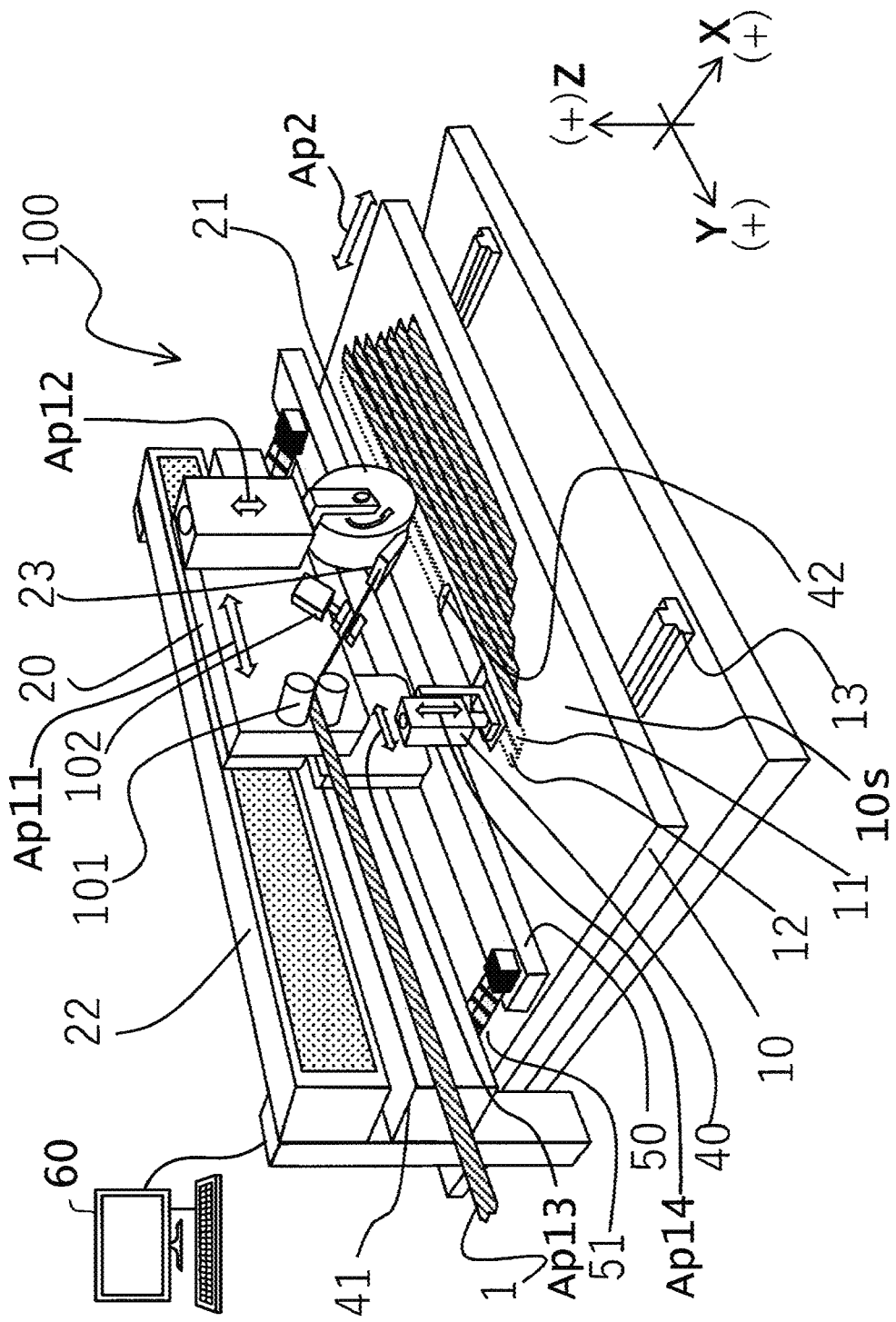
FIG. 1 is a perspective view illustrating an entire fiber placement device 100 according to one example.

1 Reinforcing fiber tow
2 Reinforcing fiber
3 Resin component
10 Placement base
10 Placement surface
11 Placement scheduled area of reinforcing fiber tow in current placement cycle
12 Placement scheduled area of reinforcing fiber tow in next placement cycle 13 Placement surface moving mechanism
14 Area having desired two-dimensional shape
15 Placement scheduled area of reinforcing fiber tow in nth placement cycle
16 Heating area
17 Heating area
18 Heating area
20 Tow arranging mechanism
20b Tow arranging mechanism
21 Tow pressing mechanism
22 Slider mechanism
23 Final guide
40 Tow cutting mechanism
41 Slider mechanism
42 Cutting blade
50 Heating mechanism
50a Heating mechanism
50b Heating mechanism
50c Heating mechanism
51 Moving mechanism
52 Temperature measuring unit
53 Heater
54 Heater housing
60 Control unit
100 Fiber placement device
100a Fiber placement device
100b Fiber placement device
100c Fiber placement device
101 Nip roller
102 Nip part
501 to 508 Heating device
Ap11 Arrow indicating operation direction of tow arranging mechanism 20 in first processing
Ap22 Arrow indicating operation direction of placement base 10 in second processing

DETAILED DESCRIPTION

A. First Example

A. Configuration and Function of First Example:

Specific examples will be described below with reference to the drawings. The following description facilitates understanding of our devices and methods, and by no means limits this disclosure. In this regard, as is readily understood by those skilled in the art, motions to preferred aspects and variations in individual examples can be simultaneously interpreted as explanation of a fiber placement device which is a generic concept.

The fiber placement device includes at least: a placement surface on which a reinforcing fiber tow is placed and stacked; a tow arranging mechanism which presses and places the reinforcing fiber tow against and on the placement surface; and a heating mechanism which partially heats the placement surface, and can move the tow arranging mechanism to a predetermined position, cause the tow arranging mechanism to move by a predetermined length in a first axial direction after the tow arranging mechanism presses the reinforcing fiber tow against the placement surface heated in advance by the heating mechanism, and repeatedly perform a placement cycle of moving the placement surface in a second axial direction which intersects the first axial direction after gluing and fixing the reinforcing fiber tow onto the placement surface, the heating mechanism is configured to be relatively movable along the second axial direction with respect to the placement surface, and the heating mechanism is moved to an upper side of an area in which the reinforcing fiber tow is placed in an nth (n is the natural number equal to or more than two) placement cycle until an (n−1)th placement cycle is finished to heat the area in advance.

Figure 2:
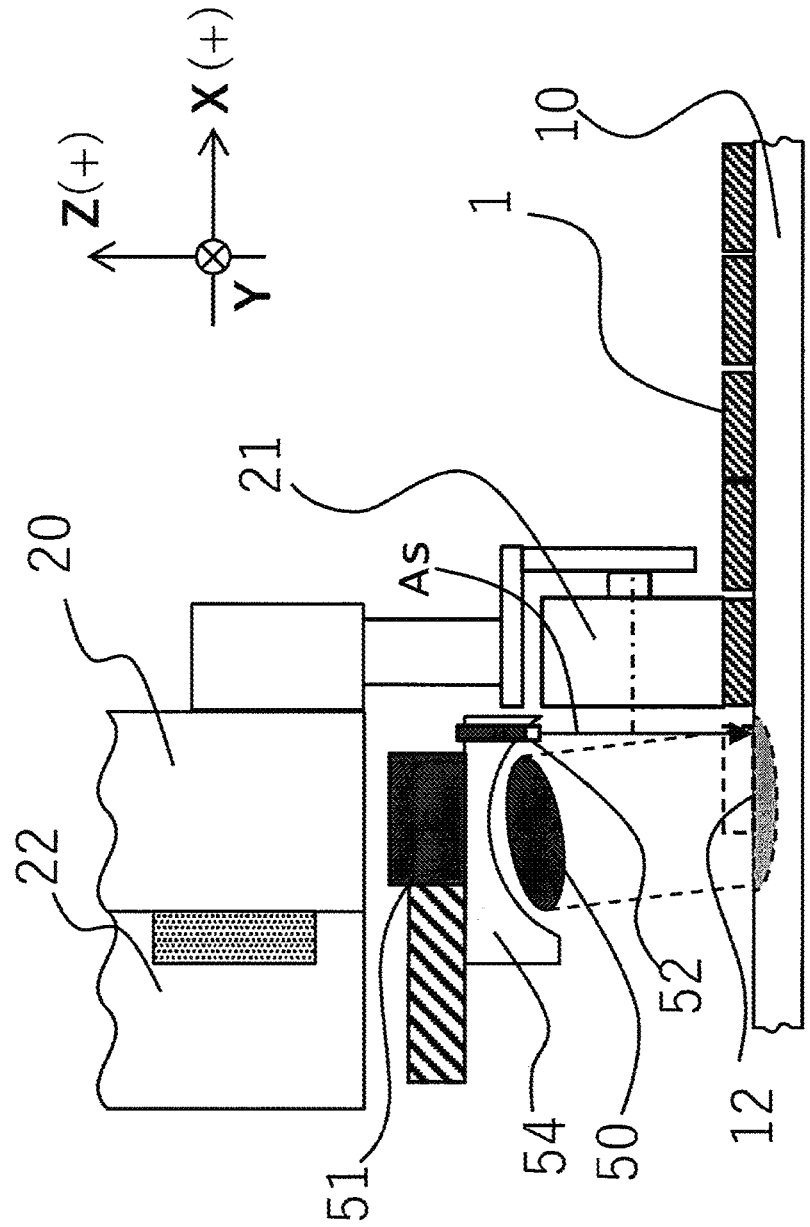
FIG. 2 is a Y axis direction perspective view for explaining an operation of a heating mechanism 50 of the fiber placement device 100 according to one example.

FIG. 1 illustrates a perspective view of an entire fiber placement device 100 according to one example. FIG. 2 illustrates a state where a heating mechanism 50 and a tow arranging mechanism 20 are seen from a Y axis + (plus) side in FIG. 1. FIG. 2 illustrates a positional relationship between the heating mechanism 50 and the tow arranging mechanism 20 of the fiber placement device 100 illustrated in FIG. 1. Examples of the fiber placement device 100 illustrated in FIGS. 1 and 2 are examples, and a configuration of the fiber placement device is by no means limited by each example.

In this example, the fiber placement device 100 includes: a placement base 10 which includes a placement surface 10s on which a reinforcing fiber tow 1 is placed and stacked; the tow arranging mechanism 20 which can press and place the reinforcing fiber tow 1 against and on the placement surface 10s; a tow cutting mechanism 40 which is positioned independently from the tow arranging mechanism 20, and cuts the reinforcing fiber tow 1 when a tow pressing mechanism 21 provided inside the tow arranging mechanism 20 presses the reinforcing fiber tow 1 against a blade tip; the heating mechanism 50 which is positioned independently from the tow arranging mechanism 20 and the tow cutting mechanism 40, and can heat the placement surface 10s; and a control unit 60 which monitors a state of each of the above-described mechanisms, and controls an operation of each device according to a program given by a user to place and stack the reinforcing fiber tow 1 in a desired shape on the placement surface 10s.

The fiber placement device 100 repeatedly performs a placement cycle described below. First, the fiber placement device 100 moves the tow arranging mechanism 20 to a predetermined position. More specifically, the tow arranging mechanism 20 is moved onto the placement surface 10s heated in advance by the heating mechanism 50. The fiber placement device 100 presses the reinforcing fiber tow 1 fed from the tow arranging mechanism 20 onto the placement surface 10s, and then moves the tow arranging mechanism 20 by a predetermined length in a first axial direction (a Y axis direction in FIG. 1). After the reinforcing fiber tow 1 is glued onto the placement surface 10s and thereby fixed, the fiber placement device 100 moves the placement base 10 in a second axial direction (an X axis direction in FIG. 1) which intersects the first axial direction. The fiber placement device 100 repeatedly performs the above-described placement cycle. A specific configuration and operation of the fiber placement device 100 will be described below.

The reinforcing fiber tow 1 is a unidirectional fiber fabric which includes at least reinforcing fibers and a resin component which exhibits adhesiveness when heated. Various material and forms of the reinforcing fiber tow 1 can be selected according to operability during an operation or required characteristics after molding. For example, as the materials of reinforcing fibers, carbon fibers, glass fibers, aramid, Kevlar and natural fibers can be used. As the materials of the resin component, a thermosetting epoxy or phenol resin, or thermoplastic polyamide, polyether ether ketone, polyether ketone ketone, and polyether sulfone can be used. Furthermore, a mixed state of the resin component with respect to the reinforcing fiber is not limited in particular. A liquid resin component may be impregnated inside a reinforcing fiber tow. The resin component may be applied as a thin film to a tow surface. Powder resin components may adhere to a tow surface.

The placement base 10 includes the placement surface 10s on which the reinforcing fiber tow 1 is placed and stacked. The placement base 10 is configured to relatively move in the X axis direction with respect to the tow arranging mechanism 20.

More specifically, the placement base 10 includes the placement surface 10s on which the reinforcing fiber tow 1 is aligned in a desired circumferential shape and placed. The placement base 10 includes a placement surface moving mechanism 13. After the tow arranging mechanism 20 places the reinforcing fiber tow 1 on the placement surface 10s in the above-described placement cycle, the placement surface moving mechanism 13 relatively moves the placement base 10 in the X axis direction with respect to the tow arranging mechanism. Furthermore, when the reinforcing fiber tow 1 is placed in the desired circumferential shape, and then the reinforcing fiber tows 1 of second and subsequent layers are placed and stacked overlapping thereon, a placement cycle for the second and subsequent layers is performed regarding that the reinforcing fiber tow 1 of the first layer is also included in the placement surface 10s.

The placement base 10, the tow arranging mechanism 20 and the heating mechanism 50 may be configured to be relatively movable in the X axis direction in the placement cycle. Hence, the placement surface moving mechanism 13 does not necessarily need to be equipped to the placement base 10 and, for example, the placement base 10 may be fixed, and the tow arranging mechanism 20, the tow cutting mechanism 40 and the heating mechanism 50 may be each configured to be movable in the X axis direction.

The tow arranging mechanism 20 can feed the reinforcing fiber tow 1 while pressing the reinforcing fiber tow 1 against the placement surface 10s, and place the reinforcing fiber tow 1 on the placement surface 10s along the Y axis direction. The tow arranging mechanism 20 is configured to relatively move in the X axis direction with respect to the placement base 10.

More specifically, the tow arranging mechanism 20 is attached to a slider mechanism 22 which is movable in the Y axis direction (see an arrow Ap11 in FIG. 1). When the slider mechanism 22 moves in a − (minus) direction of a Y axis, the tow arranging mechanism 20 is moved to an upper side of a desired tow placement start position in the Y axis direction. In this example, the reinforcing fiber tow 1 is nipped by a nip part 102 equipped to the tow arranging mechanism 20 via a nip roller 101 equipped to the tow arranging mechanism 20 likewise. A distal end of the reinforcing fiber tow 1 is guided to a lower part to the tow pressing mechanism 21 by a final guide 23 provided to the tow arranging mechanism 20. Hence, movement of the tow arranging mechanism 20 in the − (minus) direction of the Y axis causes a necessary amount of the reinforcing fiber tow 1 for placement in the current placement cycle to be pulled out from an unillustrated tow feeding part in an upstream.

When the tow pressing mechanism 21 subsequently descends in a − (minus) direction of a Z axis, and approaches the placement surface 10s, the end part of the reinforcing fiber tow 1 is pressed against a tow placement start position on the placement surface 10s (see an arrow Ap12 in FIG. 1). In this example, the tow placement start position on the placement surface 10s and a placement scheduled area 11 in the current placement cycle are heated in advance by the heating mechanism 50. Hence, the resin component included in the reinforcing fiber tow 1 pressed against the tow placement start position of the placement surface 10s and the placement scheduled area 11 is heated, then softens, and exhibits adhesiveness. As a result, the reinforcing fiber tow 1 pressed against the placement surface 10s is glued and fixed to the placement surface 10s thanks to the adhesiveness.

When the slider mechanism 22 moves the tow arranging mechanism 20 by a predetermined distance in a + (plus) direction of the Y axis, the reinforcing fiber tow 1 pulled out from the tow feeding part is sequentially pressed against the placement surface 10s, and glued and fixed onto the placement surface 10s (see the arrow Ap11 in FIG. 1). In this example, the placement scheduled area 11 in which the reinforcing fiber tow 1 is scheduled to be placed has already been heated by the heating mechanism 50 as described above. Hence, to glue the reinforcing fiber tow 1, it is not necessary to heat the placement scheduled area 11 immediately before the reinforcing fiber tow 1 is placed. Consequently, even when the tow arranging mechanism 20 is moved at a high speed, it is possible to reliably glue and fix the reinforcing fiber tow 1 onto the placement surface 10s.

The tow cutting mechanism 40 includes a cutting blade 42 which cuts the reinforcing fiber tow 1. The tow cutting mechanism 40 is configured to be movable in the Y axis direction and a Z axis direction (see arrows Ap13 and Ap14 in FIG. 1).

After the reinforcing fiber tow 1 is placed on and fixed onto the placement surface 10s along the Y axis direction (see the arrow Ap11 in FIG. 1), the cutting blade 42 of the tow cutting mechanism 40 attached to the slider mechanism 41 cuts the reinforcing fiber tow 1. The slider mechanism 41 is configured to be movable in the Y axis direction independently from the slider mechanism 22 (see the arrow Ap13 in FIG. 1). The tow pressing mechanism 21 and the tow cutting mechanism 40 ascend in a + (plus) direction of the Z axis, and evacuates from the placement surface 10s (see the arrows Ap12 and Ap14 in FIG. 1). Subsequently, the placement base 10 is moved in a + (plus) direction of an X axis along the placement surface moving mechanism 13 (see an arrow Ap2 in FIG. 1).

The above-described operation will be referred to as a series of the "placement cycle". By repeating this placement cycle, the fiber placement device 100 can place the reinforcing fiber tow 1 in the desired two-dimensional shape on the placement surface 10s.

The heating mechanism 50 can heat part of an area of the placement surface 10s. The heating mechanism 50 is configured to relatively move in the X axis direction with respect to the placement base 10. More specifically, the heating mechanism 50 is configured to be relatively movable along the second axial direction (the X axis direction in FIG. 1) with respect to the placement surface 10s of the placement base 10. The heating mechanism 50 includes a moving mechanism 51, a temperature measuring unit 52, a heater 53 and a heater housing 54.

A heating system of the heater 53 of the heating mechanism 50 can be freely selected from systems which can heat a heating target without contacting the heating target such as a convective heating system which uses hot wind or a radiation heating system which uses an infrared ray, a lamp or a laser beam. In this example, from a viewpoint of heating output (which will be referred to as an output density below) per unit area of a target, manufacturing cost and easiness of output control, the heating system of the heater 53 of the heating mechanism 50 is radiation heating which uses an infrared ray.

A higher output density of the heating mechanism 50 results in a higher speed of the placement cycle. On the other hand, a heater of a high output density leads to an increase in manufacturing cost of the fiber placement device 100.

Hence, the output density of the heater 53 of the heating mechanism 50 is preferably 1 W/mm2. The heater 53 whose output density is 1 W/mm2 or less is easy to obtain.

The heater housing 54 which grips the heater 53 preferably adopts a structure which can reflect an infrared ray radiated from the heating mechanism 50 and radiate the infrared ray only in one single direction. According to this aspect, it is possible to increase the output density of the heating mechanism 50. For example, a cross-sectional shape of the heater housing 54 is an arch shape for heating only a side directly below.

The moving mechanism 51 grips the heating mechanism 50 to move to a desired position on the placement surface 10s. The moving mechanism 51 can move the heating mechanism 50 in the X axis direction with respect to the placement surface 10s independently from the tow arranging mechanism 20. Consequently, it is possible to finely adjust a heating target area in the X axis direction.

A system of the moving mechanism 51 can be freely selected from a robot arm, a gantry crane or a parallel link. The moving mechanism 51 may be, for example, a slider mechanism which extends from the slider mechanism 22 which moves the tow arranging mechanism 20. Furthermore, the moving mechanism 51 preferably has sufficient support rigidity by taking the weight and an inertia of the heating mechanism 50 into account. Accordingly, it is possible to reliably place the heater 53 in the placement scheduled area on the placement surface 10s in a next placement cycle.

The temperature measuring unit 52 measures a temperature of the placement surface 10s heated by the heater 53. FIG. 2 illustrates an arrow As directed from the temperature measuring unit 52 to the placement surface 10s whose temperature is measured by the temperature measuring unit 52. The temperature measuring unit 52 is preferably able to measure the temperature without contacting the placement surface 10s. Such a system includes radiation temperature measurement or thermography which uses infrared rays, or optical measurement. The temperature measuring unit 52 is preferably able to measure a temperature of 0° C. to 500° C. according to a temperature range which can be heated. Furthermore, a response speed related to temperature measurement is preferably higher to be able to appropriately manage the temperature of the placement surface 10s even when the output density of the heater 53 is high. More specifically, the response speed is preferably 0.0001 second to 1 second.

The control unit 60 controls the fiber placement device 100. The control unit 60 is a computer which includes a CPU which is a processor, a RAM and a ROM. The RAM includes a main memory and an auxiliary storage device. The CPU of the control unit 60 causes the fiber placement device 100 to operate by loading a computer program stored in the auxiliary storage device and executing the computer program.

The control unit 60 can repeatedly perform the above placement cycle. The placement cycle includes first processing and second processing. The first processing is processing where the tow arranging mechanism 20 places the reinforcing fiber tow 1 of a predetermined length on the placement surface 10s along the Y axis direction (see the arrow Ap11 in FIG. 1). The second processing is processing of relatively moving the placement base 10 in the X axis direction with respect to the tow arranging mechanism 20 (see the arrow Ap22 in FIG. 1). The control unit 60 causes the heating mechanism 50 to heat a placement scheduled area 12 in which the reinforcing fiber tow 1 is placed in the nth placement cycle until the (n−1)th placement cycle is finished.

More specifically, the control unit 60 causes the heating mechanism 50 to move above the area in which the reinforcing fiber tow 1 is placed in the nth (n is a natural number equal to or more than two) placement cycle and heat an area which faces the heating mechanism 50 until the (n−1)th placement cycle is finished.

Still more specifically, the following processing is executed. The moving mechanism 51 equipped to the heating mechanism 50 is movable in the X axis direction independently from the slider mechanisms 22 and 41. As a result, the heating mechanism 50 is relatively movable in the X axis direction with respect to the tow arranging mechanism 20. The heating mechanism 50 is controlled to be located on a − (minus) side of the X axis direction with respect to the tow pressing mechanism 21 equipped to the tow arranging mechanism 20. The temperature measuring unit 52 measures the temperature of the area on the placement surface 10s heated by the heating mechanism 50.

While or before the tow arranging mechanism 20 performs the placement cycle for arranging the reinforcing fiber tow 1 in the placement scheduled area 11, the heating mechanism 50 moves to the upper side of the placement scheduled area 12 in which the reinforcing fiber tow 1 is placed after the placement scheduled area 11, and heats the placement scheduled area 12 in advance. By a time when the placement cycle for the placement scheduled area 11 is finished, and the placement cycle for the placement scheduled area 12 starts, the placement scheduled area 12 is heated to a predetermined temperature. Consequently, it is possible to start the placement cycle for the placement scheduled area 12 without waiting for a rise of the temperature of the placement scheduled area 12.

Subsequently, the above-described placement cycle is repeated until the reinforcing fiber tow is placed to form the two-dimensional shape having the desired circumferential shape input to the control unit 60. As a result, an original form of a reinforcing fiber sheet in which the plurality of reinforcing fiber tow 1 extending in the X axis direction are aligned in the Y axis direction.

In a conventional fiber placement device, a heating mechanism is mounted on a tow arranging mechanism. The heating mechanism is configured to heat a tow pressing mechanism, a reinforcing fiber tow guided to the tow pressing mechanism, and part of a placement surface in a traveling direction of the tow arranging mechanism. Accordingly, heating to paste the reinforcing fiber tow on the placement surface is performed during a placement cycle for this area. Hence, an initial heating standby time to heat the placement surface such that an end part of the reinforcing fiber tow is pasted on the placement surface is required at a time of start of an arranging operation. Furthermore, a continuous heating standby time to heat the placement surface prior to placement of the reinforcing fiber tow is required during the arranging operation. Hence, when the reinforcing fiber tow is placed, a slider mechanism which moves the tow arranging mechanism can move only at a low speed to match with the continuous heating standby time. Furthermore, at a beginning of placement of the reinforcing fiber tow, the slider mechanism needs to start movement at a very low speed to match with the initial heating standby time. As a result, a tact time required for the placement cycle increases.

On the other hand, in a last placement cycle, the fiber placement device 100 heats in advance the placement scheduled area of the reinforcing fiber tow in the current placement cycle. Consequently, it is possible to place the reinforcing fiber tow without the above-described initial heating standby time and continuous heating standby time, and make a speed of the placement cycle higher.

The heating mechanism 50 which has been moved to the area in which the reinforcing fiber tow is placed in the nth placement cycle preferably heats in advance an entire area in which the reinforcing fiber tow in the nth placement cycle is placed to make a speed of the placement cycle higher.

More specifically, the area defined by the width and the length of the reinforcing fiber tow which can be placed on the placement surface 10s in one placement cycle by the tow arranging mechanism 20 can preferably include an area in which the heating mechanism 50 can simultaneously heat the placement surface 10s. A maximum width of the reinforcing fiber tow which can be placed on the placement surface 10s in one placement cycle by the tow arranging mechanism 20 will be referred to as a "maximum placement width". A maximum length of the reinforcing fiber tow which can be placed on the placement surface 10s in one placement cycle by the tow arranging mechanism 20 will be referred to as a "maximum placement length". The area which can be heated by the heating mechanism 50 simultaneously in the placement surface 10s will be referred to as a "heatable area".

A Y axis direction dimension of the heatable area preferably matches with the maximum placement length. An X axis direction dimension of the heatable area is preferably approximately 1 to 10 times as large as the maximum placement width. Accordingly, it is possible to heat a placement scheduled area in a next cycle of a currently executed placement cycle and, in addition, the placement scheduled area of a subsequent placement cycle. In this regard, increasing the heatable area causes an increase in cost of the fiber placement device, and makes the components other than the heating mechanism in the fiber placement device difficult. Consequently, the X axis direction dimension of the heatable area is preferably five times as large as or equal to or less than the maximum placement width.

Furthermore, the heating mechanism 50 preferably heats in advance the area in which the reinforcing fiber tow 1 is placed in the nth placement cycle while the (n−1)th placement cycle is performed. More specifically, at least while the tow arranging mechanism 20 performs the placement cycle for the placement scheduled area 11, the heating mechanism 50 preferably heats the next placement scheduled area 12. Accordingly, it is possible to reduce a time taken from heating to placement of the reinforcing fiber tow 1. Consequently, it is possible to increase energy use efficiency. As a result, it is possible to reduce cost required for placement of a reinforcing fiber tow.

When heating the placement scheduled area 12 is finished before the placement cycle for the placement scheduled area 11 is performed, and the placement scheduled area 12 is not heated while the placement cycle for the placement scheduled area 11 is performed has a following task. Heat given to the placement scheduled area 12 is radiated by heat conduction into the placement surface 10s, and convection and radiation to surrounding environment. While a heat radiation amount differs according to a temperature difference from surroundings or a heat quantity and a thermal conductivity of the placement surface 10s, part of energy required for heating is lost due to heat radiation in any aspect. To reduce cost required to place a reinforcing fiber tow, it is preferable to use energy required for heating to highly efficiently melt binders. Hence, the placement scheduled area 12 is preferably heated until the placement cycle for the last placement scheduled area 11 is performed.

Figure 3:
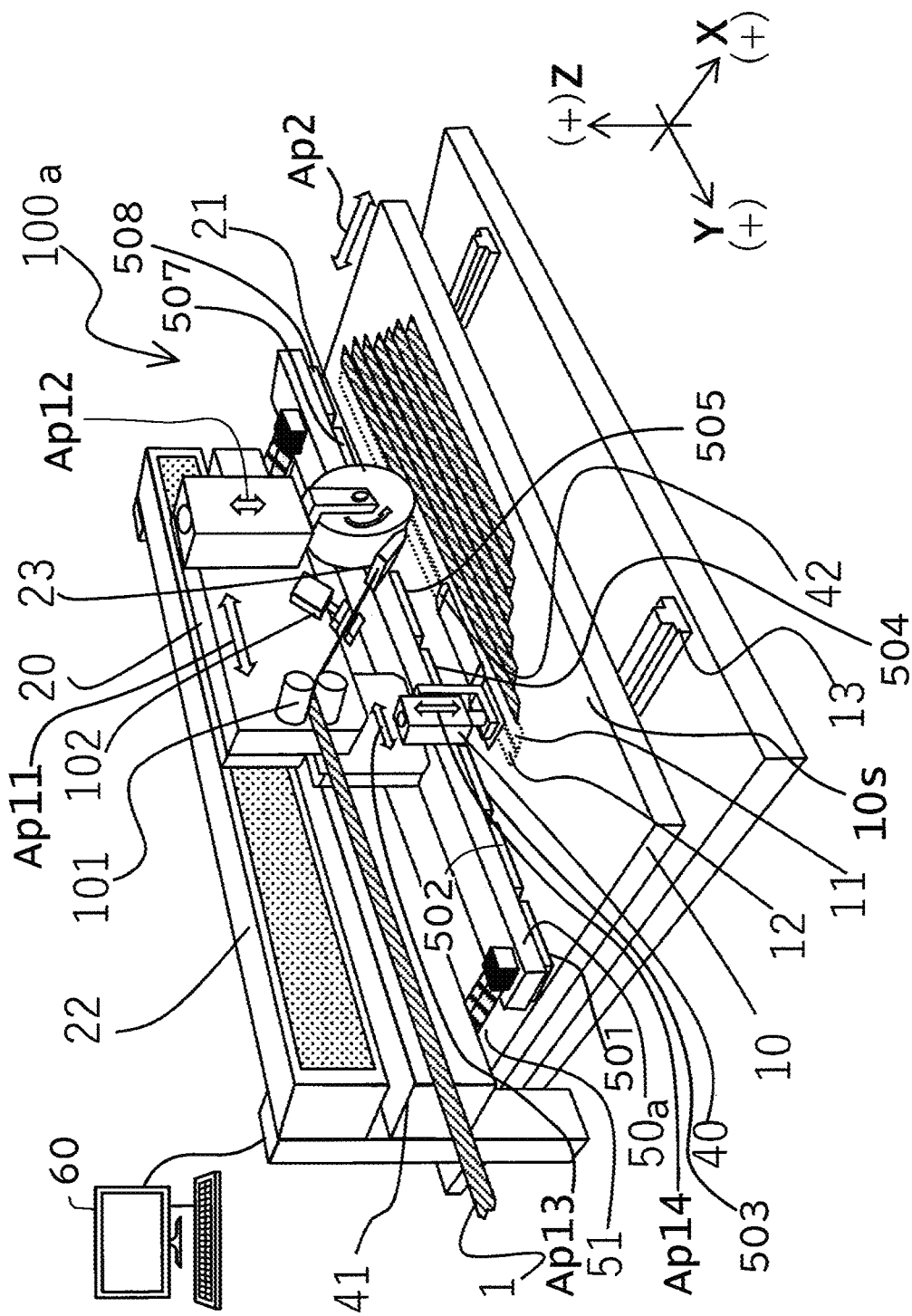
FIG. 3 is a perspective view of an entire fiber placement device 100a according to a modified example of the first example.

A2. Modified Example of First Example:

FIG. 3 is a perspective view of an entire fiber placement device 100a according to a modified example of the first example. The fiber placement device 100a according to this modified example includes a heating mechanism 50a instead of the heating mechanism 50 equipped to the fiber placement device 100 according to the above first example. Other points of a hardware configuration of the fiber placement device 100a are the same as those of the fiber placement device 100.

The heating mechanism 50a includes eight heating devices 501 to 508 placed along the Y axis direction. The heating devices 501 to 508 each include the heater 53. The heating devices 501 to 508 each include the temperature measuring unit 52, and can control feedback of a heating target temperature. The heating devices 501 to 508 can be each independently controlled. More specifically, on/off and output of the heating devices 501 to 508 can be independently controlled.

The control unit 60 sets a higher temperature to a heating device which heats an area in which the reinforcing fiber tow 1 is lastly placed in the nth placement cycle among the heating devices 501 to 508 to a temperature of a heating device which heats an area in which the reinforcing fiber tow 1 is first placed in the nth placement cycle among the heating devices 501 to 508. More specifically, a setting temperature of the heating device which heats the area in which the reinforcing fiber tow 1 is first placed is set as the lowest temperature among the heating devices 501 to 508. The setting temperature of the heating device which heats the area in which the reinforcing fiber tow 1 is placed last is set as the lowest temperature among the heating devices 501 to 508. A higher setting temperature of each heating device located between these two heating devices is set to each heating device closer to the heating device which heats the area in which the reinforcing fiber tow 1 is lastly placed. In the example in FIG. 3, the heating device which heats the area in which the reinforcing fiber tow 1 is first placed is the heating device 503, and the heating device which heats the area in which the reinforcing fiber tow 1 is placed last is the heating device 508.

A shape of a reinforcing fiber sheet formed by the fiber placement device is similar to a final shape of a product, and therefore there is often a situation where the length of the reinforcing fiber tow to be placed per placement cycle differs. The length in the Y axis direction of the reinforcing fiber tow to be placed will be also referred to as a "placement length". It is preferable to not heat a part at which the reinforcing fiber tow is not placed in the Y axis direction, and heat the part at which the reinforcing fiber tow is placed. This modified example can realize such heating.

In addition, in this modified example, the heating mechanism 50a includes the eight heating devices 501 to 508. In this regard, the number of heating devices equipped to the heating mechanism may be another number. In this regard, the number of heating devices equipped to the heating mechanism is preferably two to ten.

In this modified example, the control unit 60 performs heating as described above such that an output density of the individual heating device becomes higher in order along a direction from − to + of the Y axis.

In an area closer to an end on a +side of both ends in the Y axis direction of the placement scheduled area 12, a time taken until the reinforcing fiber tow is placed after the heating mechanism 50a finishes heating becomes longer.

Hence, a heat radiation amount is larger in an area closer to the end on the Y axis direction + side, and a temperature at a time when the reinforcing fiber tow is placed becomes substantially lower than a temperature at a time when heating is performed. By setting the output densities of the plurality of heating devices as described above, it is possible to give a temperature gradient which takes heat radiation into account to the placement scheduled area. As a result, it is possible to place the reinforcing fiber tow in a state where each placement scheduled area has an optimal temperature. Furthermore, excessive heating is not performed in an area closer to an end on a − side of the both ends in the Y axis direction of the placement scheduled area 12, so that it is possible to avoid wasteful energy consumption.

The Y axis direction in this example will be also referred to as a "first direction". The X axis direction will be also referred to as a "second direction".

B. Second Example

Figure 4:
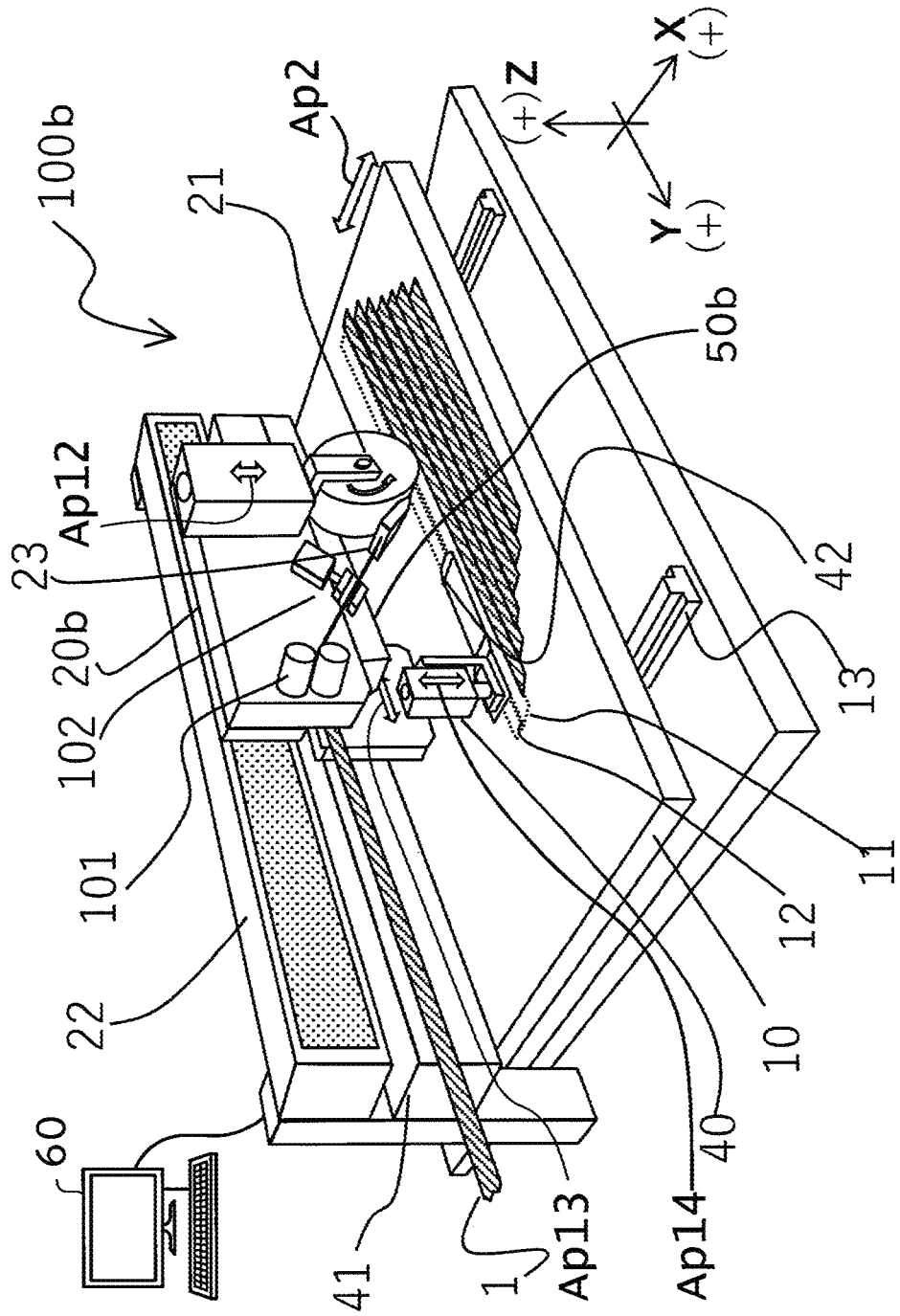
FIG. 4 is a perspective view illustrating an entire fiber placement device 100b according to one example.
Figure 5:
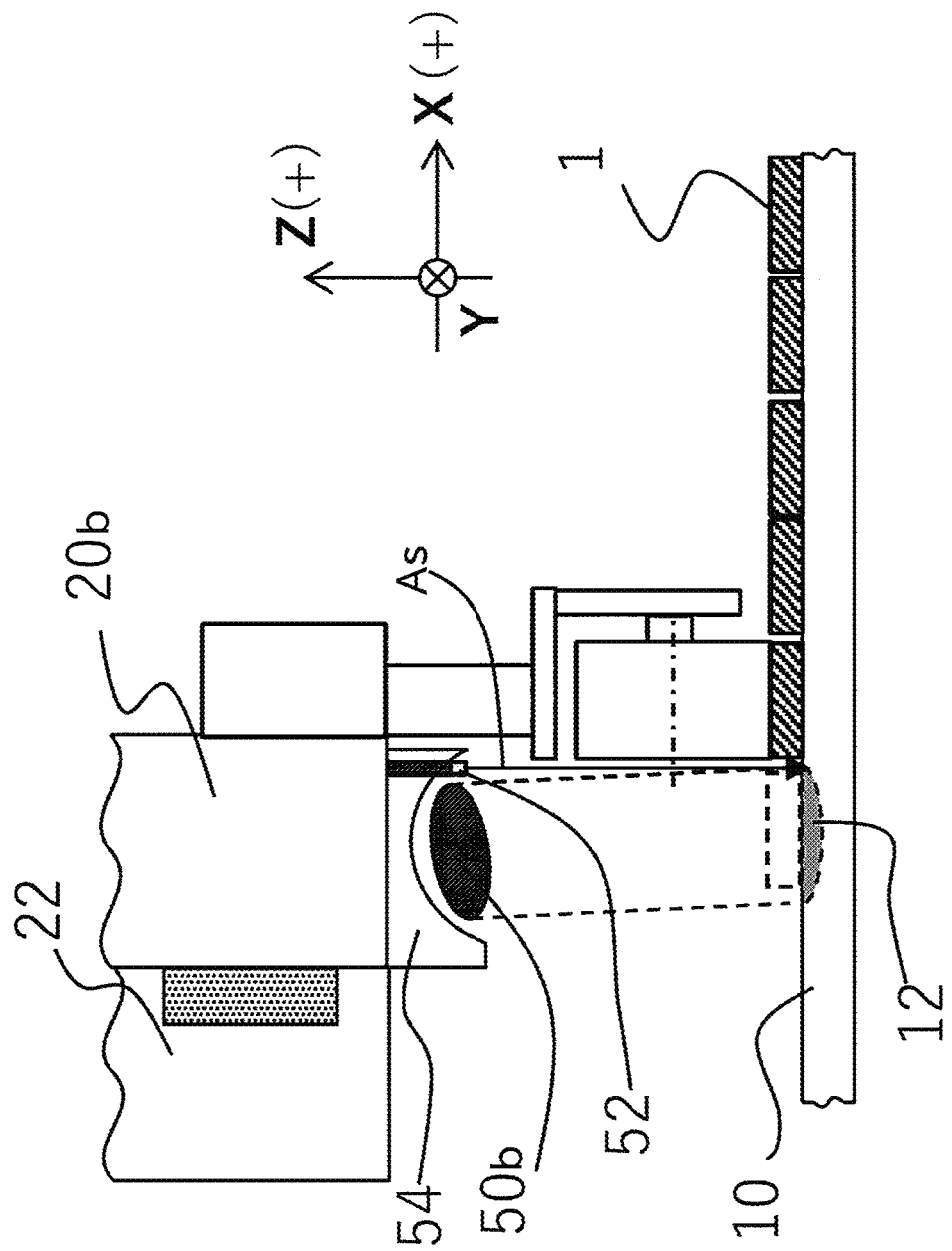
FIG. 5 is an explanatory view illustrating a state where a heating mechanism 50b included in a fiber placement device 100c lies along a Y axis direction.

FIG. 4 illustrates a perspective view of a fiber placement device 100b according to an example different from the fiber placement device 100 according to the first example. Furthermore, FIG. 5 illustrates a state where a heating mechanism 50b included in the fiber placement device 100b is seen along the Y axis direction.

The fiber placement device 100b includes a tow arranging mechanism 20b instead of the tow arranging mechanism 20 equipped to the fiber placement device 100 according to the first example. The fiber placement device 100b includes the heating mechanism 50b instead of the heating mechanism 50 equipped to the fiber placement device 100. Other points of the fiber placement device 100b are the same as those of the fiber placement device 100 according to the first example.

A configuration of the tow arranging mechanism 20b is the same as the configuration of the tow arranging mechanism 20 according to the first example except that the heating mechanism 50b is attached.

The heating mechanism 50b is provided to the tow arranging mechanism 20b. When the tow arranging mechanism 20b is moved along the Y axis direction by the slider mechanism 22, the heating mechanism 50b is moved along the Y axis direction together with the tow arranging mechanism 20b. According to this example, a size of the heating mechanism 50b in the Y axis direction is configured to be small compared to the heating mechanism 50 according to the first example to not hinder an operation of the tow arranging mechanism 20b. Hence, the size in the Y axis direction of the area on the placement surface 10s which the heating mechanism 50b can heat is shorter than the maximum placement length. The heating mechanism 50b is configured to heat part of the placement surface 10s on the Y axis direction + side seen from the tow pressing mechanism 21, and part of the area of the placement surface 10s on the X axis direction-side.

The heating mechanism 50b heats the placement surface 10s directly below the heating mechanism 50b while the tow arranging mechanism 20 moves in the Y axis direction in the above-described placement cycle. The placement surface 10s directly below the heating mechanism 50b is a placement scheduled area on the X axis direction-side with respect to the reinforcing fiber tow 1 which is currently placed, and is a placement scheduled area in a next placement cycle.

According to this example, it is possible to miniaturize the heating mechanism 50b, and reduce device cost and running cost. Furthermore, it is possible to heat a next placement scheduled area even when the placement surface 10s has a three-dimensional shape. Consequently, the fiber placement device 100b is suitable as a device which manufactures small parts of complicated shapes.

C. Third Example

Figure 6:
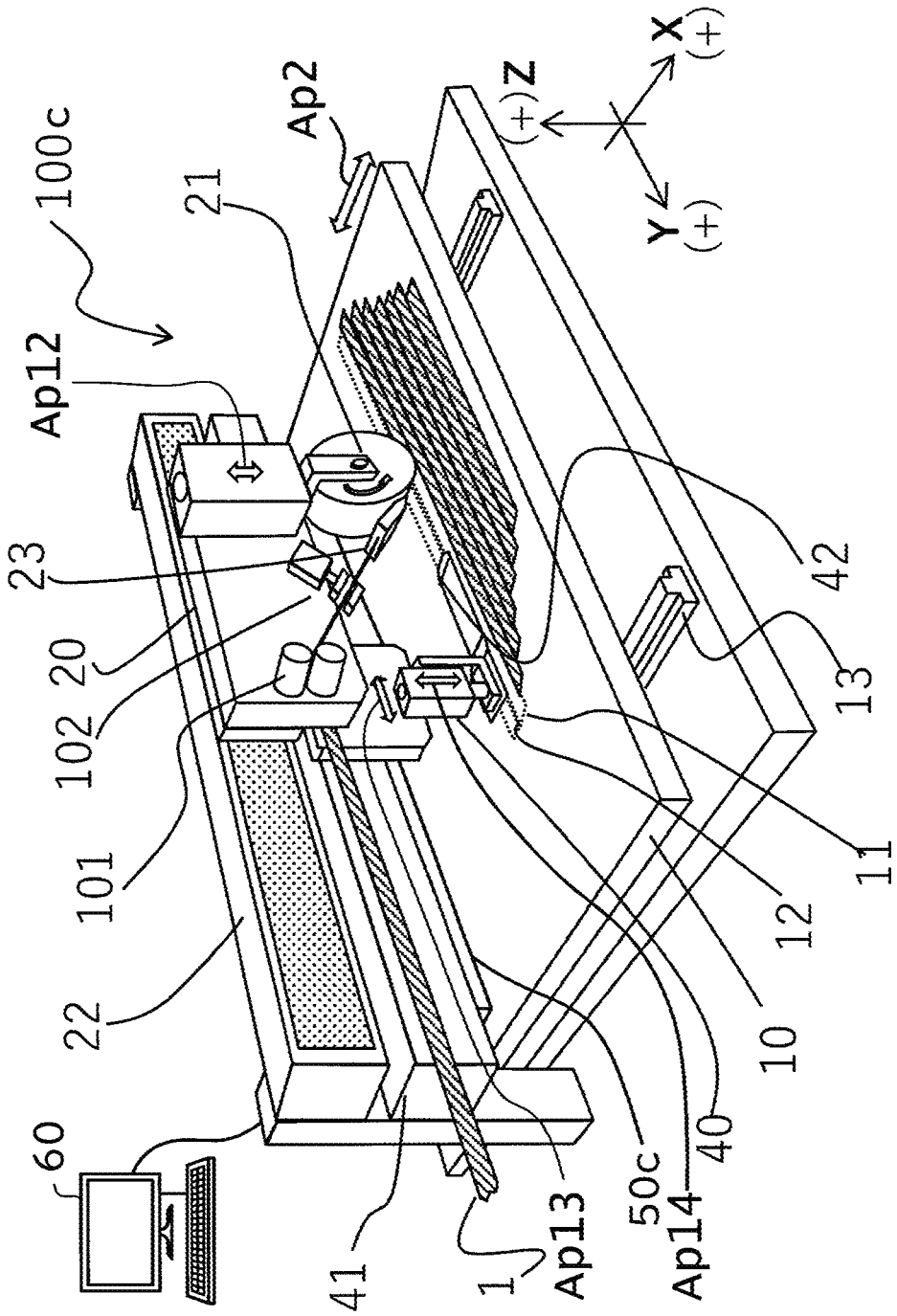
FIG. 6 is an explanatory view explaining an operation of the heating mechanism 50c of the fiber placement device 100c according to one example.

FIG. 6 illustrates a perspective view of a fiber placement device 100c according to still another example. Furthermore, FIG. 7 illustrates a state where a heating mechanism 50c included in the fiber placement device 100c lies along the Y axis direction.

The fiber placement device 100c includes the heating mechanism 50c instead of the heating mechanism 50 equipped to the fiber placement device 100 according to the first example. Other points of the fiber placement device 100c are the same as those of the fiber placement device 100 according to the first example.

The heating mechanism 50c is provided along the entire length in the Y axis direction of the placement surface 10s. The heating mechanism 50c is attached to the slider mechanism 22. A distance in the X axis direction between the heating mechanism 50c and the tow arranging mechanism 20 is fixed. Hence, in this fiber placement device 100c, the heating mechanism 50c heats an area in which the reinforcing fiber tow is placed a fixed cycle (e.g., one to five cycles) after in the area in which the tow arranging mechanism 20 in a certain placement cycle. The fiber placement device 100c does not include the moving mechanism 51 of the fiber placement device 100. Hence, cost of the fiber placement device 100c is low.

In this regard, as long as the heating mechanism 50c is independently movable with respect to the placement surface 10s, a target to which the heating mechanism 50c is fixed is not limited to the slider mechanism 22. The heating mechanism 50c may be fixed to, for example, a frame member which supports the slider mechanism 22 or other members with a bracket interposed therebetween.

D. Relationship Between Placement Scheduled Area And Heating Area

Figure 8A:
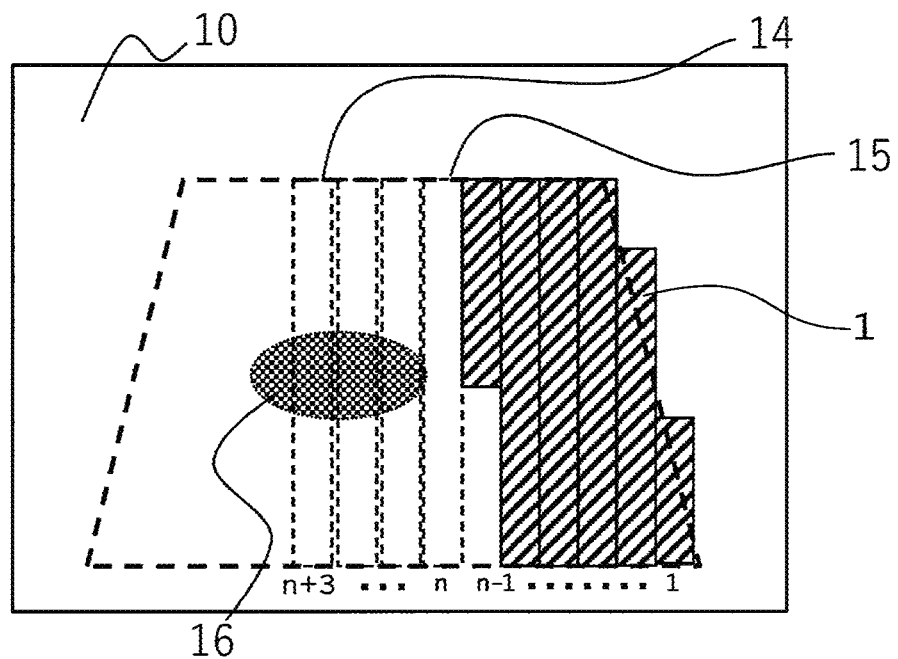
FIG. 8A is an explanatory view explaining a positional relationship between a placement cycle of a tow arranging mechanism and a heating area of a heating mechanism according to one example.
Figure 8B:
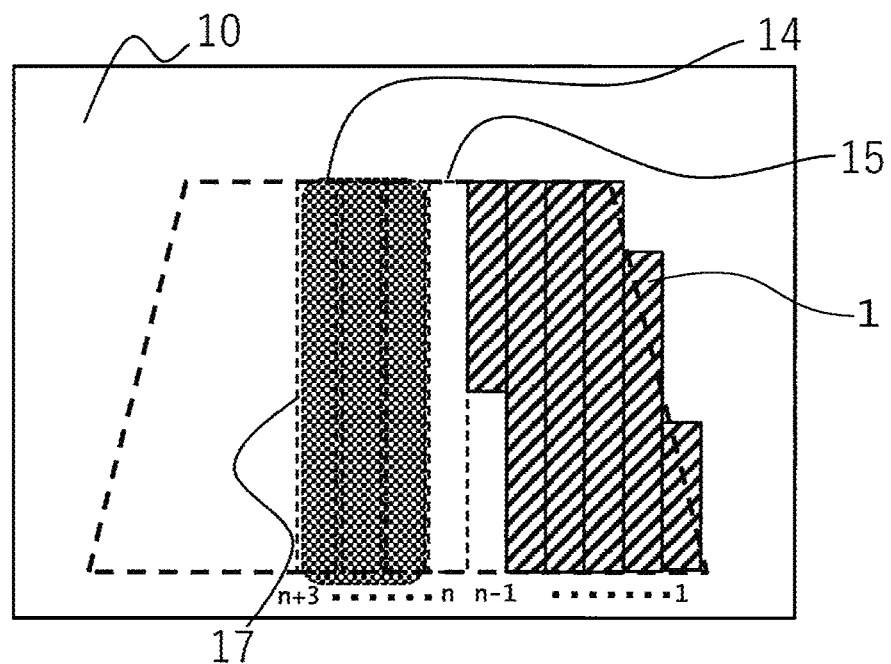
FIG. 8B is an explanatory view explaining a positional relationship between the placement cycle of the tow arranging mechanism and the heating area of the heating mechanism according to one example.
Figure 8C:
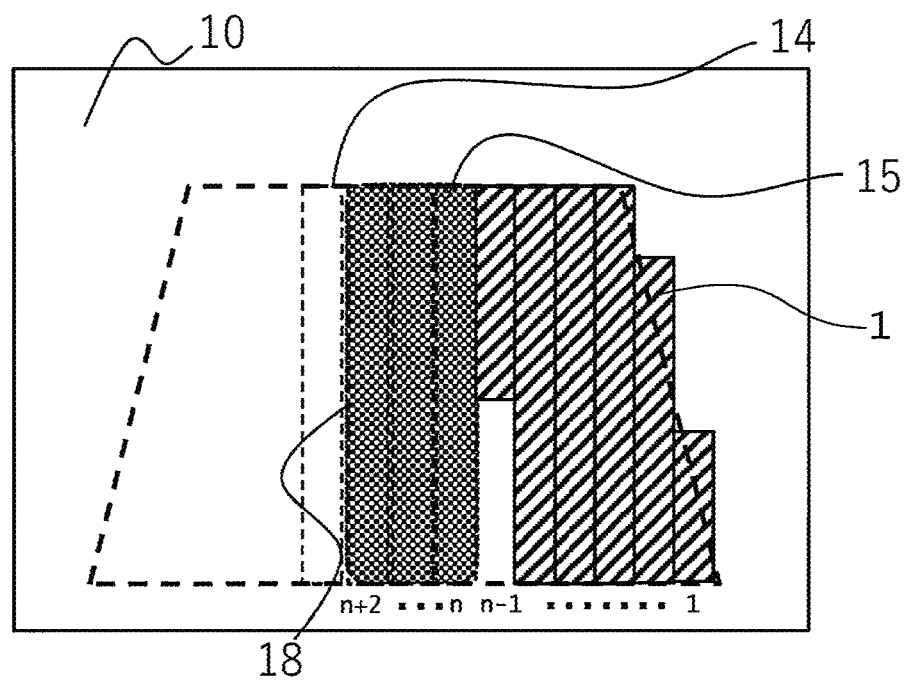
FIG. 8C is an explanatory view explaining a positional relationship between the placement cycle of the tow arranging mechanism and the heating area of the heating mechanism according to one example.

FIGS. 8A to 8C are explanatory views illustrating heating areas. In each of examples illustrated in FIGS. 8A to 8C, a placement cycle is repeatedly performed to place the reinforcing fiber tow 1 on the placement surface 10s and further stack the reinforcing fiber tow 1. Numbers 1 to (n+3) which indicate an order of a placement cycle of arranging reinforcing fiber tows which form the first layer are illustrated in lower parts in FIGS. 8A to 8C. Each of FIGS. 8A to 8C illustrates a state where an (n−1)th (n is an arbitrary integer equal to or more than two) placement cycle is being performed.

In FIGS. 8A to 8C, areas 14 surrounded by bold broken lines are areas in which the reinforcing fiber tows 1 are scheduled to be placed. In FIGS. 8A to 8C, areas to which diagonal lines are applied are areas in which the reinforcing fiber tows 1 have already been placed. In FIGS. 8A to 8C, areas 15 surrounded by thin broken lines are areas in which the reinforcing fiber tows 1 are placed in nth and subsequent placement cycles. In FIGS. 8A to 8C, areas to which checkered patterns are applied are heating areas 16, 17 and 18 which are heated while the (n−1)th (n is an arbitrary integer equal to or more than two) placement cycle is performed.

At one of points of time until the (n−1)th placement cycle is finished, at least part of the placement scheduled area 15 of the reinforcing fiber tow in the nth and subsequent placement cycles is heated.

Part of the placement scheduled area 15 in the nth and subsequent placement cycles may be heated during a (n−k)th (k is a natural number which satisfies k<n) placement cycle In the example in FIG. 8A, the heating area 16 in the (n−1)th placement cycle is configured to be across each of part of the placement scheduled areas in (n+1)th to (n+3)th placement cycles.

It is preferable to heat the entire placement scheduled area in advance to make a speed of the placement cycle higher. In the example in FIG. 8B, the heating area 17 in the (n−1)th placement cycle is an entire placement scheduled area of the (n+1)th to (n+3)th placement cycles.

It is preferable to heat the placement scheduled area of the reinforcing fiber tow in the next placement cycle to reduce energy loss due to heat radiation from the preheated area. In the example in FIG. 8C, the heating area 18 in the (n−1)th placement cycle is an entire placement scheduled area of the nth to (n+2)th placement cycles.

E. Other Examples

E1. Other Example 1:

According to the first example, the entire placement scheduled area 12 in which the reinforcing fiber tow 1 is placed in the nth placement cycle is simultaneously heated by the heating mechanism 50. However, the area in which the reinforcing fiber tow is placed in the nth placement cycle may be heated by a plurality of times of heating processing.

E2. Other Example 2:

According to the above first and third examples, the control unit 60 causes the heating mechanism 50 to heat whole area in which the reinforcing fiber tow 1 is placed in the nth placement cycle until the (n−1)th placement cycle is finished (see FIGS. 8B and 8C, too). However, there may also be employed an aspect where, as illustrated in the example in FIG. 8A, the heating mechanism 50 heats part of areas in which the reinforcing fiber tow 1 is placed in the nth placement cycle until the (n−1)th placement cycle is finished.

It is preferable to finish heating the area in which the reinforcing fiber tow 1 is firstly placed in the nth placement cycle until the (n−1)th placement cycle is finished. That is, it is preferable to raise the temperature of the area in which the reinforcing fiber tow 1 is first placed in the nth placement cycle to a target temperature until the nth placement cycle is started.

E3. Other Example 3:

In the example illustrated in FIG. 8C, the control unit 60 causes the heating mechanism 50 to heat the area in which the reinforcing fiber tow 1 is placed in the nth placement cycle during a period in which the (n−1)th placement cycle is executed. However, the control unit 60 may cause the heating mechanism 50 to heat the area in which the reinforcing fiber tow 1 is placed in a placement cycle after the nth placement cycle during a period in which the (n−1)th placement cycle is executed.

E4. Other Example 4:

According to the modified example of the above first example, the heating mechanism 50a includes the plurality of heating devices 501 to 508 which are aligned along the Y axis direction, and can be each controlled independently. Furthermore, the control unit 60 sets a higher temperature to the heating device 508 which heats the area in which the reinforcing fiber tow 1 is placed last in the nth placement cycle among the plurality of heating devices 501 to 508 than a temperature of the heating device 503 which heats the area in which the reinforcing fiber tow 1 is placed first. However, whole area in which the reinforcing fiber tow 1 is placed in the nth placement cycle may be set with an identical target temperature, and heated.

This disclosure is not limited to the above-described examples, and can be realized by various configurations without departing from the spirit of the disclosure. For example, technical features in the examples corresponding to technical features in each configuration disclosed in the summary can be replaced or combined as appropriate to solve part or entirety of the above-described task or to achieve part or entirety of the above-described effect. Furthermore, these technical features can be deleted as appropriate if the technical features are not described as indispensable in the description.

This application is based upon and claims benefit of priority from Japanese Patent Application No. 2020-059393, filed on Mar. 30, 2020, the entire content of which is incorporated herein by reference.

The invention claimed is:

1. A method for placing a fiber, the method comprising:
   placing and stacking a reinforcing fiber tow on a surface of a fiber placement device;
   feeding the reinforcing fiber tow while pressing the reinforcing fiber tow against the surface, and placing the reinforcing fiber tow on the surface along a first direction by an automated fiber placement head;
   repeatedly performing a placement cycle that includes
      placing the reinforcing fiber tow of a predetermined length on the surface along the first direction, and
      relatively moving the surface in a second direction with respect to the automated fiber placement head, the second direction intersecting the first direction, wherein each placement cycle involves a different length of the reinforcing fiber tow; and
   heating at least part of an area in which the reinforcing fiber tow is placed in an nth (n is a natural number equal to or more than two) placement cycle until an (n−1)th placement cycle is finished,
   wherein heating of the at least part of the area is performed independently of the placement of the reinforcing fiber tow wherein in the heating step, a plurality of heaters which are independently controlled and used to provide higher temperature heating to an area in which the reinforcing fiber tow is placed last in the nth placement cycle compared to a temperature applied to an area in which the reinforcing fiber tow is placed first in the nth placement cycle.

2. The method according to claim 1, wherein the heating step comprises heating substantially the whole area in which the reinforcing fiber tow is placed in the nth placement cycle until the (n−1)th placement cycle is finished.

3. The method according to claim 2, wherein the heating step occurs during a period in which the (n−1)th placement cycle is executed.

4. A method for placing a fiber, the method comprising:
   placing and stacking a reinforcing fiber tow on a surface of a fiber placement device;
   feeding the reinforcing fiber tow while pressing the reinforcing fiber tow against the surface, and placing the reinforcing fiber tow on the surface along a first direction by an automated fiber placement head;
   repeatedly performing a placement cycle that includes placing the reinforcing fiber tow of a predetermined length on the surface along the first direction, and relatively moving the surface in a second direction with respect to the automated fiber placement head, the second direction intersecting the first direction, wherein each placement cycle involves a different length of the reinforcing fiber tow; and heating at least part of an area in which the reinforcing fiber tow is placed in an nth (n is a natural number equal to or more than two) placement cycle until an (n−1)th placement cycle is finished, wherein the heating step comprises heating substantially the whole area in which the reinforcing fiber tow is placed in the nth placement cycle until the (n−1)th placement cycle is finished, wherein in the heating step, a plurality of heaters which are independently controlled and used to provide higher temperature heating to an area in which the reinforcing fiber tow is placed last in the nth placement cycle compared to a temperature applied to an area in which the reinforcing fiber tow is placed first in the nth placement cycle.

5. The method according to claim 1, wherein the heating step occurs during a period in which the (n−1)th placement cycle is executed.

6. A method for placing a fiber, the method comprising:

placing and stacking a reinforcing fiber tow on a surface of a fiber placement device;

feeding the reinforcing fiber tow while pressing the reinforcing fiber tow against the surface, and placing the reinforcing fiber tow on the surface along a first direction by an automated fiber placement head;

repeatedly performing a placement cycle that includes placing the reinforcing fiber tow of a predetermined length on the surface along the first direction, and relatively moving the surface in a second direction with respect to the automated fiber placement head, the second direction intersecting the first direction, wherein each placement cycle involves a different length of the reinforcing fiber tow; and heating at least part of an area in which the reinforcing fiber tow is placed in an nth (n is a natural number equal to or more than two) placement cycle until an (n−1)th placement cycle is finished, wherein the heating step occurs during a period in which the (n−1)th placement cycle is executed, wherein in the heating step, a plurality of heaters which are independently controlled and used to provide higher temperature heating to an area in which the reinforcing fiber tow is placed last in the nth placement cycle compared to a temperature applied to an area in which the reinforcing fiber tow is placed first in the nth placement cycle.

7. A method for placing a fiber, the method comprising:

placing and stacking a reinforcing fiber tow on a surface of a fiber placement device;

feeding the reinforcing fiber tow while pressing the reinforcing fiber tow against the surface, and placing the reinforcing fiber tow on the surface along a first direction by an automated fiber placement head;

repeatedly performing a placement cycle that includes placing the reinforcing fiber tow of a predetermined length on the surface along the first direction, and relatively moving the surface in a second direction with respect to the automated fiber placement head, the second direction intersecting the first direction, wherein each placement cycle involves a different length of the reinforcing fiber tow; and heating at least part of an area in which the reinforcing fiber tow is placed in an nth (n is a natural number equal to or more than two) placement cycle until an (n−1)th placement cycle is finished, wherein in the heating step, a plurality of heaters which are independently controlled and used to provide higher temperature heating to an area in which the reinforcing fiber tow is placed last in the nth placement cycle compared to a temperature applied to an area in which the reinforcing fiber tow is placed first in the nth placement cycle.

* * * * *